United States Patent [19]

Burrows

[11] Patent Number: 4,880,534

[45] Date of Patent: Nov. 14, 1989

[54] REVERSE OSMOSIS WATER PURIFICATION SYSTEM WITH IMPROVED PRESSURE RELIEF VALVE

[76] Inventor: Bruce D. Burrows, 25581 Via Paladar, Valencia, Calif. 91355

[21] Appl. No.: 249,518

[22] Filed: Sep. 26, 1988

[51] Int. Cl.$^4$ ............................................. B01D 13/00
[52] U.S. Cl. ..................... 210/130; 210/136; 210/257.2; 210/321.65; 210/321.83; 251/61.2
[58] Field of Search ............ 210/130, 136, 137, 257.2, 210/321.65, 321.83, 422, 433.1, 434; 251/61, 61.2

[56] References Cited

U.S. PATENT DOCUMENTS

| | | | |
|---|---|---|---|
| 2,597,693 | 5/1952 | Wolcott, Jr. | 210/136 |
| 3,542,199 | 11/1970 | Bray | 210/136 |
| 3,568,843 | 3/1971 | Brown | 210/258 |
| 4,077,883 | 3/1978 | Bray | 210/136 |
| 4,176,063 | 11/1979 | Tyler | 210/321.65 |
| 4,190,537 | 2/1980 | Tondreau et al. | 210/321.65 |

FOREIGN PATENT DOCUMENTS 110862   5/1964   Czechoslovakia .
1546696  5/1979   United Kingdom .

Primary Examiner—Richard V. Fisher
Assistant Examiner—Christopher Upton
Attorney, Agent, or Firm—Kelly Bauersfeld & Lowry

[57] ABSTRACT

An improved pressure relief valve is provided in a reverse osmosis water purification system to prevent the pressure of produced purified water from exceeding a predetermined pressure limit. In the water purification system, ordinary tap or feed water is supplied to a reverse osmosis module which produces a purified water supply coupled for flow to a pressurized storage reservoir to await dispensing, and a reject water supply coupled through a backpressuring restrictor for flow to a drain. The relief valve comprises a valve head with differential surface areas exposed respectively and directly to the pressure of the purified water supply and to the pressure of the reject water supply upstream of the restrictor, wherein the differential surface areas are chosen for valve head movement to open a purified water relief port when the purified water pressure reaches a selected proportional limit relative to the reject water pressure. A diaphragm operates in conjunction with the valve head to positively prevent reject water leakage into the purified water supply.

12 Claims, 2 Drawing Sheets

REVERSE OSMOSIS WATER PURIFICATION SYSTEM WITH IMPROVED PRESSURE RELIEF VALVE

BACKGROUND OF THE INVENTION

This invention relates generally to water purification systems of the reverse osmosis type for producing a supply of relatively purified water for drinking, cooking, etc. More particularly, this invention relates to an improved pressure relief valve for use in such water purification systems, wherein the pressure relief valve is designed for accurate and reliable operation to prevent the pressure of produced purified water from exceeding a predetermined pressure limit.

Reverse osmosis water purification systems in general are relatively well known in the art for producing a supply of purified water from an incoming supply of ordinary feed or tap water or the like. In such systems, the feed or tap water is coupled to a reverse osmosis module including an appropriate membrane for separating the feed water supply into a relatively pure water supply and a relatively impure or reject water supply. The purified water supply is normally coupled for flow into a suitable pressurized storage reservoir to await dispensing through a conventional faucet valve or the like. Conversely, the reject water supply is coupled for flow to and discharge as waste through a suitable drain path. As is known in the art, for proper operation of the reverse osmosis module, the reject water drain path includes a restrictor which functions to maintain a substantial backpressure acting upon the membrane.

In many water purification systems of the general type described above, the storage reservoir comprises a compact tank or vessel having an internal flexible bladder which separates the tank interior into two distinct chambers. The produced purified water is coupled for flow into one of these chambers, whereas the other chamber contains a compressible gas such as air. As the tank fills with produced purified water, the compressible gas is reduced in volume to progressively increase the pressure acting through the bladder upon the purified water for dispensing purposes. However, this increasing pressure applied to the purified water reduces the pressure differential across the reverse osmosis membrane to correspondingly reduce the operational efficiency of the reverse osmosis module. That is, as the pressure of the purified water approaches the pressure of the reject water supply upstream of the restrictor, the operational efficiency of the reverse osmosis module progressively diminishes. If the purified water pressure is allowed to reach equilibrium with the reject water pressure, the desired pressure differential across the membrane is eliminated to result in potential migration of impurities through the membrane to the produced purified water.

In the past, pressure relief valves have been proposed to prevent pressurization of the produced purified water beyond a selected pressure limit relative to the pressure of the reject water supply. That is, such pressure relief valves are designed to maintain a minimum pressure differential across the reverse osmosis membrane during all conditions of system operation, including a substantially filled condition for the purified water reservoir. Such relief valves function by the use of complex valve structures designed to bleed produced purified water into the reject water supply when the predetermined pressure limit is reached. See, for example, U.S. Pat. Nos. 3,542,199; 3,568,843; and 4,077,883. However, such prior pressure relief valves have not provided reliably accurate pressure control of a purified water supply. Moreover, such prior relief valves have utilized valve structures and related seal components which undesirably leak pressurized reject water into the produced purified water supply during certain failure mode conditions.

There exists, therefore, a significant need for an improved pressure relief valve for use in reverse osmosis water purification systems, wherein the improved pressure relief valve is designed for accurate pressure limiting operation with respect to produced purified water, without permitting inadvertent leakage of reject water into the produced purified water supply. The present invention fulfills these needs and provides further related advantages.

SUMMARY OF THE INVENTION

In accordance with the invention, a reverse osmosis water purification system or the like is provided with an improved pressure relief valve for preventing pressurization of a produced purified water supply beyond a predetermined pressure limit. The pressure relief valve comprises a valve head with differential surface areas to provide a fixed proportional comparison between the pressure of a produced purified water supply and a pressurized reject water supply. The differential surface areas on the valve head are designed to insure valve head movement to open a purified water relief port whenever the purified water pressure reaches a predetermined proportion of the reject water pressure. A diaphragm cooperates with the valve head for positively preventing reject water flow into the produced purified water supply.

The reverse osmosis water purification system includes a reverse osmosis module adapted for connection to an incoming supply of ordinary feed or tap water or the like. The reverse osmosis module includes a membrane which functions, as is known in the art, to separate the feed water supply into a relatively purified water supply and a relatively impure reject water supply having impurities concentrated therein. The purified water supply is coupled for flow to a suitable pressurized storage reservoir, whereas the reject water supply is coupled through a backpressuring restrictor to a suitable drain.

In a preferred form, the pressure relief valve comprises a relatively simple and compact valve assembly mounted within the reverse osmosis module in flow communication with the purified and reject water supplies. The valve assembly includes means for supporting the backpressuring restrictor in the form of an elongated narrow tube or the like for coupling the reject water supply with substantial pressure drop for flow to the drain. A pressure port formed in the valve assembly communicates the pressure of the reject water supply at a position substantially upstream of the restrictor to a pressure chamber. The valve head is movably carried within the valve assembly and defines a first surface area exposed to the reject water pressure within the pressure chamber, and a second surface area exposed to the pressure of the produced purified water supply. When the pressure of the produced purified water reaches a selected proportion of the reject water pressure, as determined by the proportional sizes of the first and second surface areas on the valve head, the valve head is displaced to open a relief port communicating excess purified water to the drain.

In accordance with further aspects of the invention, the valve head is physically separated from the pressure chamber by a flexible diaphragm. Reject water within the pressure chamber acts through the diaphragm directly upon the first surface area of the valve head. However, the diaphragm positively isolates the pressurized reject water supply within the pressure chamber from the relief port or the purified water supply to prevent inadvertent reject water flow into the purified water supply when the relief port is closed.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
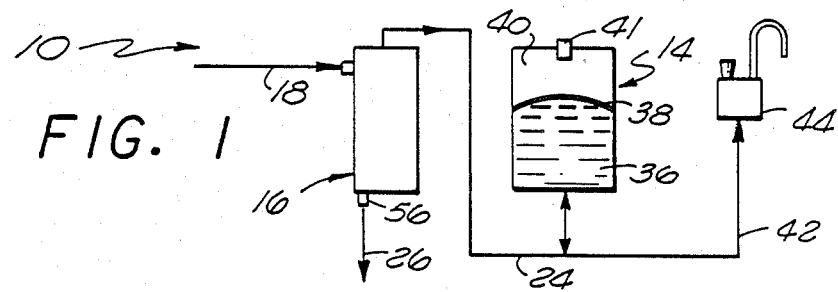
FIG. 1 is a schematic diagram illustrating a reverse osmosis water purification system including a reverse osmosis module and pressurized storage reservoir for receiving and storing a produced purified water supply.
Figure 2:
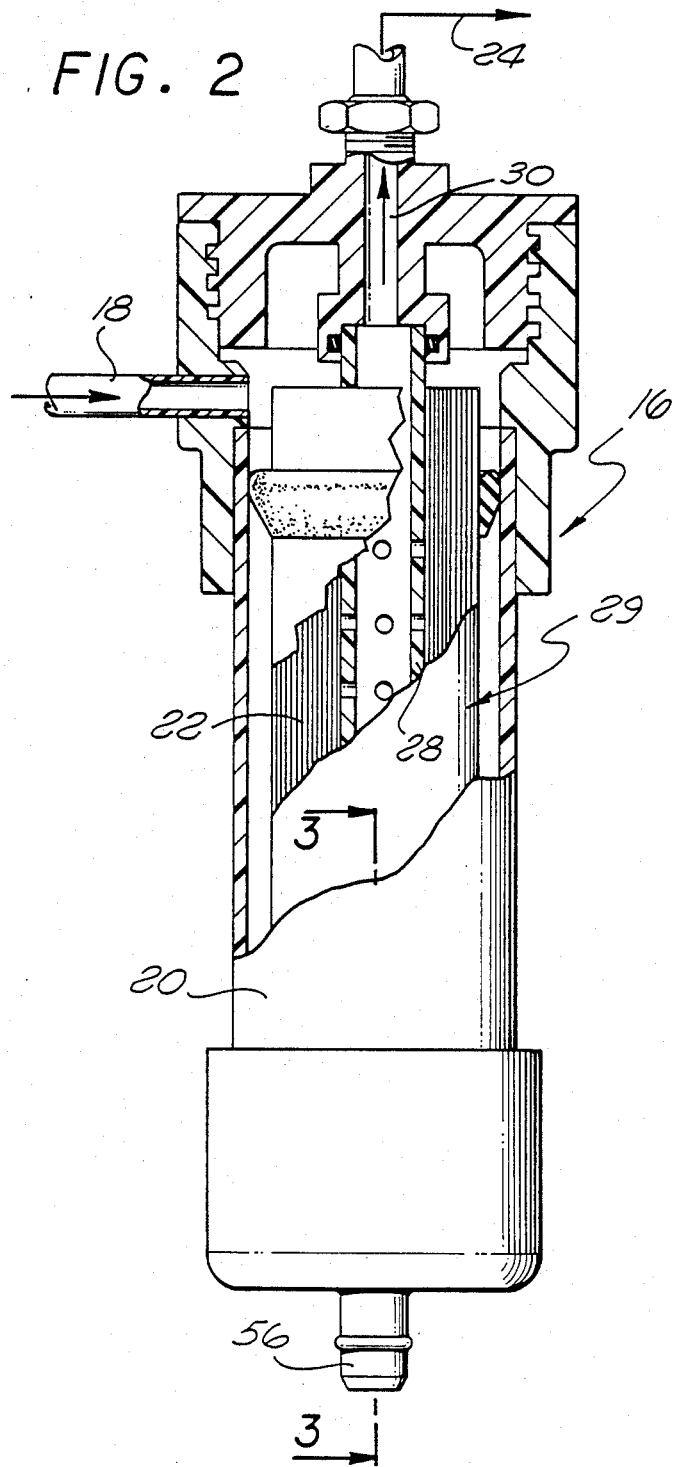
FIG. 2 is an enlarged fragmented and partially elevational view of a reverse osmosis module for the water purification system.
Figure 4:
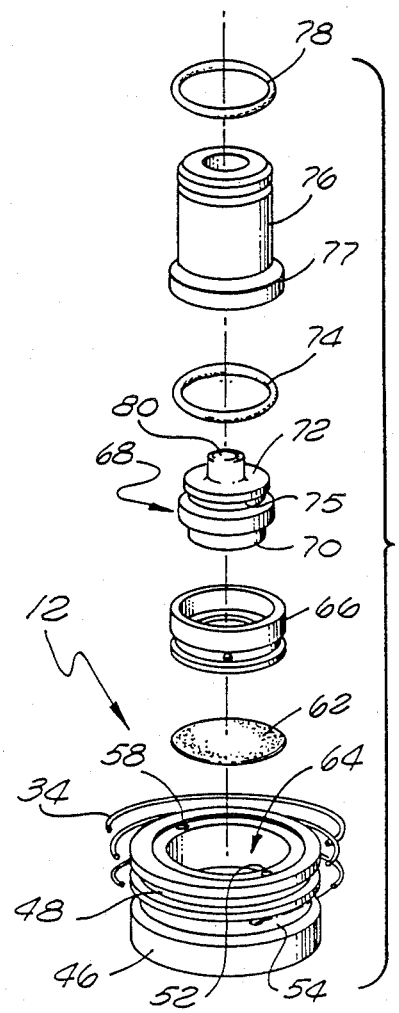
FIG. 4 is an exploded perspective view illustrating assembly of the pressure relief valve.
Figure 3:
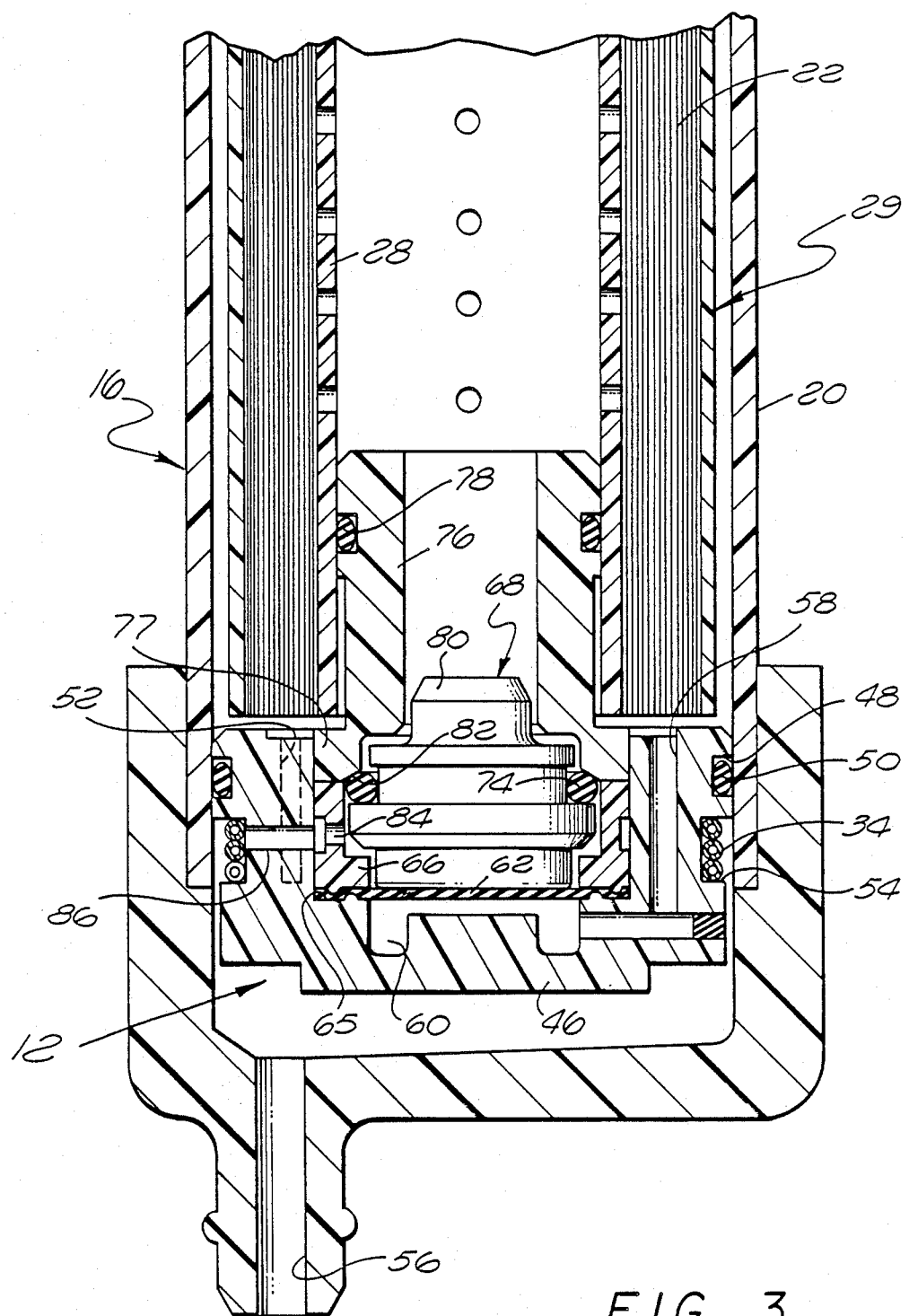
FIG. 3 is a further enlarged fragmented vertical sectional view taken generally on the line 3—3 of FIG. 2, and depicting an improved pressure relief valve embodying the novel features of the invention.

As shown in the exemplary drawings, a water purification system of the reverse osmosis type is referred to generally in FIG. 1 by the reference numeral 10. The purification system includes, in accordance with the invention, an improved pressure relief valve 12 (FIGS. 3 and 4) for limiting the pressure of a produced purified water supply contained within a storage reservoir 14 (FIG. 1). By limiting the pressure of the produced purified water supply, the pressure relief valve 12 insures reliable and efficient operation of a reverse osmosis module 16 (FIGS. 1-3).

The water purification system 10 is constructed and operates generally in accordance with reverse osmosis purification systems known in the art. More particularly, the system 10 includes the reverse osmosis module 16 coupled to a feed or tap water supply conduit 18 for receiving an incoming supply of feed or tap water for purification purposes. The reverse osmosis module 16 comprises a housing 20 encasing a reverse osmosis membrane 22 of a type known in the art for separating the incoming feed water supply into a substantially purified water supply having suspended and/or dissolved impurities removed therefrom, and a reject or brine water supply having the impurities concentrated therein. In general terms, the produced purified water supply is coupled through a conduit 24 for flow into and storage within the reservoir 14 to await dispensing, whereas the reject water supply is coupled through a drain conduit 26 for discharge as waste to an appropriate drain. Importantly, as is known in the art, the drain path for the reject water supply includes a restrictor (not shown in FIG. 1) for maintaining a fluidback pressure on the reverse osmosis module 16 to insure proper and efficient module operation. In accordance with one aspect of the invention, as will be described, the restrictor is conveniently integrated into the improved pressure relief valve 12.

Although the construction details for the reverse osmosis module may vary, the illustrative drawings show the reverse osmosis membrane 22 wrapped about an upstanding perforated support tube 28 to define a cartridge 29 adapted for simple replacement installation as a unit into the module housing 20. Incoming feed water flows through the membrane 22 for separation into the purified and reject water supplies. The purified water supply passes into the support tube 28 for flow through an outlet port 30 in the module housing 20 and further passage through the conduit 24 to the storage reservoir 14. The reject water supply is discharged to the drain conduit 26 through the restrictor shown in FIG. 3 in the form of an elongated tube 34 carried by the improved relief valve 12.

The produced purified water supply flows through the pure conduit 24 into a pure water chamber 36 within the storage reservoir 14. This reservoir 14 comprises a suitable storage vessel or tank having an internal flexible barrier or bladder 38 which separates the tank interior into the pure water chamber 36 and a second chamber 40 adapted to receive a supply of a compressible fluid such as air through an appropriate fill valve 41 or the like. As is known in the art, supply of purified water into the pure water chamber 36 causes the bladder 38 to deform in a manner expanding the pure water chamber 36 which decreases the volume of the second chamber 40. Such volumetric changes are accompanied by compression of the fluid in the chamber 40 to apply a progressively increasing pressure to the stored purified water. This fluid pressure applied to the purified water is effective to deliver a flow of the purified water through a dispensing conduit 42 and a faucet valve 44 when the faucet valve is opened.

The improved pressure relief valve 12 of the present invention is designed to limit the pressure applied to the produced purified water within the storage reservoir 14 as the pure water chamber 36 is filled. More specifically, the purified water produced by the reverse osmosis module 16 is coupled to and gradually fills the pure water chamber 36 within the reservoir 14, resulting in increased pressure applied to the stored purified water unless and until the faucet valve 44 is opened for dispensing purposes. The pressure of the purified water acts through the pure conduit 24 and the perforated support tube 28 upon the pure side of the membrane 22. Accordingly, the differential pressure across the membrane 22 defined by the reject and purified water supply pressures progressively decreases. This decrease in differential pressure is accompanied by a progressive reduction in the operational efficiency of the reverse osmosis module. Moreover, if this pressure differential were permitted to reach an equilibrium condition, impurities in the reject water can migrate through the membrane to contaminate the produced purified water supply. The pressure relief valve 12 is designed to limit the pressure of the purified water supply to a predetermined proportion of the reject water pressure, thereby maintaining acceptable module efficiency at all times and preventing contamination of the purified water supply.

As shown best in FIG. 3, the relief valve 12 comprises a compact valve assembly seated within the base or lower end of the module housing 20 in a position disposed in direct flow communication with the reject water supply surrounding the membrane 22 and the produced purified water supply within the membrane support tube 28. Specifically, the valve assembly is defined by a generally cylindrical valve body 46 having an external upper annular groove 48 for receiving a seal ring 50 such as an 0-ring or the like to seal against the interior of the module housing. A reject drain port 52 is formed in the valve body 46 to couple the reject water supply within the module housing 20 for in-line passage through the elongated tube 34 wrapped loosely about the valve body 46 within a lower external annular groove 54. A downstream end of this support tube 34 opens freely into the lower groove 54 for reject water drainage downwardly around the valve body 46 and passage through a housing drain port 56 coupled to the drain conduit 26. Accordingly, as previously described, the tube 34 defines a restrictor through which the reject water supply is discharged to the drain while maintaining a satisfactory operational backpressure on the reject water side of the membrane 22. The specific backpressure applied by the restrictor tube 34 may be accurately chosen and controlled by selection of the tube diametric size and length.

The relief valve 12 further includes a pressure port 58 having an upstream end open to the reject water side of the membrane 22 and thus communicating with the pressurized reject water supply. This pressure port 58 in turn has a downstream end opening into a pressure chamber 60 within the valve body 46. A resilient diaphragm 62 lines one side of this pressure chamber 60. More particularly, as viewed in FIGS. 3 and 4, the valve body 46 includes an upwardly open counterbore 64 with an annular shoulder 65 surrounding an upper margin of the pressure chamber 60. The diaphragm 62 comprises a resilient disk of elastomer material or the like and is seated with its peripheral edge resting upon the shoulder 65. A retainer ring 66 is installed into the counterbore above the diaphragm 62 and functions in cooperation with the shoulder 65 to hold the diaphragm firmly in place.

A plug-like valve head 68 is mounted within the retainer ring 66. This valve head 68 has a lower surface area 70 of precision selected dimension rested or abutted directly against the diaphragm 62. In addition, the valve head 68 includes an upper or opposite surface area 72 of relatively precision dimension defined by the upwardly presented area circumscribed by a seal ring 74 seated within a valve head groove 75. A valve seat cylinder 76 in turn has a lower edge seated upon the retainer ring 66 and an upper end projected into the support tube 28 of the reverse osmosis cartridge 29. A lower shoulder 77 of the cylinder 76 is positioned to abut the lowermost end of the support tube 28, and a seal ring 78 on the upper end of the cylinder 76 engages the interior of the support tube. An upper plug 80 of the valve head 68 conveniently guides into the cylinder 76 to permit upward valve head movement to a position engaging the seal ring 74 with a valve seat 82 on the cylinder 76. When such engagement occurs, as viewed in FIG. 3, relief flow of purified water is prevented, as will be described.

More specifically, during normal operating conditions when the pure water chamber 36 of the reservoir 14 is below a substantially filled condition, the pressure of the reject water within the pressure chamber 60 is sufficient to maintain the valve head seal ring 74 engaged with the valve seat 82. The reject water pressure acts through the diaphragm 62 directly upon the lower surface 70 of the valve head in direct opposition to the pressure of the purified water acting against the upper end of the valve head 68 as defined by its effective upwardly presented surface area including the seal ring 74. Notably, the pressure chamber 60 is sealed against flow such that the reject water is supplied thereto substantially without pressure drop and further without risk of inadvertent flow into the purified water supply.

When the reservoir 14 reaches a substantially filled condition as represented by a predetermined maximum purified water pressure relative to the reject water pressure, the valve head 68 displaces away from the valve seat 82 to open the relief valve. In this mode of operation, a bleed flow of purified water is permitted from the support tube 28 into the interior of the valve body 46. This bleed flow passes further through a port 84 in the retainer ring 66 and a port 86 in the valve body 46 for leakage flow past the restrictor tube 34 to the drain. Importantly, the purified water bleed flow is maintained in parallel with the reject water drain flow path until a low pressure region downstream of the restrictor tube 34 is reached for purposes of preventing undesired mixing of purified and reject water in the event of failure of seal components.

The improved relief valve 12 thus provides a relatively simple structure designed for reliable control of purified water pressure in a reverse osmosis purification system. The purified water pressure is limited to a set maximum proportion of the reject water pressure, wherein the limit may be controlled with great accuracy by precision formation of the differential upper and lower valve head surface areas. In a preferred design, the purified water pressure will be limited to about two-thirds of the reject water pressure to maintain an efficient pressure differential across the membrane 22. Importantly, the diaphragm 62 provides a safeguard against failure mode mixing of the purified water and reject water supplies.

A variety of modifications and improvements to the improved pressure relief valve and related water purification system will be apparent to those skilled in the art. For example, for ease of assembly, the retainer ring 66 and valve seat cylinder 76 may be formed as single component for suitable mounting into the valve body 46 as by threading. Accordingly, no limitation on the invention is intended by way of the foregoing description and accompanying drawings, except as set forth in the appended claims.

What is claimed is:

1. A reverse osmosis water purification system, comprising:

a reverse osmosis module for receiving a feed water supply and for producing therefrom a supply of relatively purified water and a supply of relatively impure reject water;

a storage reservoir having a pure water chamber for receiving and storing purified water, said storage reservoir including means for pressurizing the purified water therein to a pressure level directly proportional to the quantity of purified water within said reservoir;

means for coupling the purified water from said reverse osmosis module to said storage reservoir;

faucet valve means coupled to said storage reservoir for dispensing purified water from said storage reservoir;

drain means for coupling the reject water from said reverse osmosis module to a drain, said drain means including a restrictor for flow of the object water with substantial pressure drop from said reverse osmosis module to the drain; and a pressure relief valve for limiting the pressure of the purified water within said storage reservoir to a predetermined proportion of the pressure of the reject water generally at an upstream end of said restrictor, said pressure relief valve including a valve body defining a relief port, and a valve head with first and second differential surface areas exposed respectively to the pressure of the reject water generally at the upstream end of said restrictor and to the pressure of the purified water, said valve head being movable in response to the pressures applied to said differential surface areas between closed and open positions respectively closing and opening said relief port, said relief port when opened permitting bleed flow of purified water to the drain to limit the pressure of the purified water;

said relief valve including means carried by said valve body to isolate said valve head from direct contact with reject water.

2. The water purification system of claim 1 wherein said relief valve includes means defining a pressure chamber and a pressure port for communicating said pressure chamber with the pressure of the reject water generally at the upstream end of said restrictor, said first differential surface area of said valve head being supported by said valve body to define a movable wall at one side of said pressure chamber.

3. The water purification system of claim 2 wherein said movable wall further includes a resilient diaphragm carried by said valve body and interposed between said pressure chamber and said first differential surface area of said valve head, said diaphragm forming said means to isolate said valve head against direct contact with the reject water within said pressure chamber while permitting pressure communication therebetween.

4. The water purification system of claim 1 wherein said restrictor comprises an elongated tube having an upstream end communicating with the reject water within said reverse osmosis module and a downstream end communicating with the drain, said tube including at least a portion thereof wrapped about said valve body.

5. The water purification system of claim 1 wherein said means for pressurizing the purified water within said reservoir comprises a flexible bladder wherein said reservoir to divide the interior of said reservoir into said pure water chamber and a second chamber, said second chamber having a compressible fluid therein.

6. In combination with a reverse osmosis water purification system having a reverse osmosis module for producing a supply of relatively purified water and a supply of relatively impure reject water, a storage reservoir for storing the purified water under pressure, a drain, and means including a pressure drop restrictor for coupling the reject water for flow from the reverse osmosis module to the drain, a pressure relief valve for limiting the storage pressure of the purified water, comprising:

a valve body defining a relief port communicating between the purified water under pressure and the drain for bleed flow of purified water to the drain generally in parallel with the flow of reject water to the drain, and a pressure chamber communicating with reject water at a position generally upstream of the restrictor; and a valve head having first and second differential surface areas exposed respectively to the pressure of the reject water within said pressure chamber and to the purified water under pressure, said valve head being movable between a closed position to close said relief port when the pressure of the purified water is below a predetermined level and to open said relief port when the pressure of the purified water exceeds said predetermined level;

said relief valve including means carried by said valve body to isolate said valve head from direct contact with reject water.

7. The pressure relief valve of claim 6 wherein said first differential surface area of said valve head defines a movable wall at one side of said pressure chamber.

8. The pressure relief valve of claim 7 further including a resilient diaphragm interposed between said first differential surface area and said pressure chamber, said diaphragm forming said means to isolate said valve head against direct contact with reject water.

9. In combination with a water purification system having a supply of purified water stored under pressure and a supply of reject water under pressure, a pressure relief valve assembly for limiting the pressure of the purified water to a predetermined proportion of the pressure of the reject water, said relief valve assembly comprising:

valve body means defining a first flow path for relieving the reject water through a restrictor to a drain and a second flow path for relieving the purified water to a drain, said first and second flow paths being oriented in parallel flow relation to each other;

a valve head including means for closing said valve seat to prevent flow of the purified water along said second flow path to said drain, said valve head including a first surface area exposed to the pressure of the reject water and a second surface area exposed to the pressure of the purified water, said valve head being movable in response to the pressures applied to said first and second surface areas to close the valve seat when the purified water pressure is below said predetermined proportion of the reject water pressure and to open the valve seat when the purified water pressure exceeds said predetermined proportion;

said valve body means including a valve body, a pressure chamber formed within said valve body with one wall of said pressure chamber defined by a movable diaphragm, and a pressure port communicating the pressure of the reject water to said pressure chamber, said first surface area of said valve heat abuttingly engaging said diaphragm.

10. The pressure relief valve of claim 9 wherein said valve seat is defined by a cylindrical member carried by said valve body, said valve head being interposed generally between said valve seat and said diaphragm.

11. The pressure relief valve of claim 10 wherein said valve body further defines a relief port communicating between the interior of said valve body and the drain.

12. The pressure relief valve of claim 10 wherein said restrictor comprises an elongated tube having at least a portion thereof wrapped about said valve body.

* * * * *